United States Patent
Surin et al.

(10) Patent No.: US 12,456,116 B2
(45) Date of Patent: Oct. 28, 2025

(54) SYSTEM AND METHOD UTILIZING CHAIN OF TRUST

(71) Applicant: Visa International Service Association, San Francisco, CA (US)

(72) Inventors: Anjana Surin, San Francisco, CA (US); Alan Johnson, Herriman, UT (US); Ansar Ansari, San Francisco, CA (US); Jalpesh Chitalia, Castro Valley, CA (US); Ramesh Shankar, San Francisco, CA (US); Manjush Menon, San Francisco, CA (US); Mark Cline, San Francisco, CA (US); Sanjeev Sharma, San Francisco, CA (US); Sayeed Mohammed, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/626,358

(22) PCT Filed: Jul. 20, 2020

(86) PCT No.: PCT/US2020/042724
§ 371 (c)(1),
(2) Date: Jan. 11, 2022

(87) PCT Pub. No.: WO2021/011934
PCT Pub. Date: Jan. 21, 2021

(65) Prior Publication Data
US 2022/0207527 A1    Jun. 30, 2022

Related U.S. Application Data

(60) Provisional application No. 62/875,771, filed on Jul. 18, 2019.

(51) Int. Cl.
*G06Q 20/38* (2012.01)
*G06Q 20/36* (2012.01)
(Continued)

(52) U.S. Cl.
CPC ... *G06Q 20/38215* (2013.01); *G06Q 20/3674* (2013.01); *G06Q 20/40145* (2013.01);
(Continued)

(58) Field of Classification Search
CPC ...... G06Q 20/30–39; G06Q 20/40–409; H04L 9/32–329
(Continued)

(56) References Cited

U.S. PATENT DOCUMENTS 8,346,666 B2   1/2013   Lindelsee et al.
8,732,475 B2   5/2014   Fahrny et al.
(Continued)

FOREIGN PATENT DOCUMENTS

AU    2016416139 A1    11/2018
CN    109716342 A       5/2019
(Continued)

OTHER PUBLICATIONS

A. Swift, "How to Remove a Phone from Trusted Devices in Google Account Settings", https://tunecomp.net/remove-phone-from-trusted-devices-google-account/, Sep. 4, 2019, 11 pages.
(Continued)

*Primary Examiner* — John W Hayes
*Assistant Examiner* — Cristina Owen Sherr
(74) *Attorney, Agent, or Firm* — Kilpatrick Townsend & Stockton LLP

(57) ABSTRACT

Embodiments of the invention are directed to systems and methods for authenticating a user device using an authenticating device that has previously been associated with a user and/or a credential. The user may initiate a transaction at the
(Continued)

user device. An authenticating device associated with the transaction may be sent an authentication request corresponding to the user device. The user may indicate whether or not the user device is authenticated utilizing the authenticating device. If the user device is authenticated, the transaction may proceed. If the user device is not authenticated the transaction may be rejected.

20 Claims, 11 Drawing Sheets

(51) Int. Cl.
  *G06Q 20/40* (2012.01)
  *H04L 9/32* (2006.01)
(52) U.S. Cl.
  CPC ....... *G06Q 20/4097* (2013.01); *H04L 9/3213* (2013.01); *H04L 9/3228* (2013.01); *H04L 9/3231* (2013.01); *G06Q 2220/00* (2013.01); *H04L 2209/56* (2013.01)
(58) Field of Classification Search
  USPC .......................................................... 705/76
  See application file for complete search history.

(56) References Cited

U.S. PATENT DOCUMENTS

| | | | |
|---|---|---|---|
| 9,996,835 B2 | 6/2018 | Dill et al. | |
| 10,015,147 B2 | 7/2018 | Narayan et al. | |
| 10,129,250 B2 | 11/2018 | Oberheide et al. | |
| 2005/0154925 A1* | 7/2005 | Chitrapu | H04L 9/3234 726/19 |
| 2005/0165684 A1* | 7/2005 | Jensen | G06Q 20/425 705/44 |
| 2008/0041936 A1* | 2/2008 | Vawter | G06Q 20/326 235/380 |
| 2012/0197740 A1* | 8/2012 | Grigg | G06Q 20/3278 705/16 |
| 2013/0173811 A1* | 7/2013 | Ha | H04L 12/2821 709/227 |
| 2014/0230019 A1 | 8/2014 | Civelli et al. | |
| 2015/0254665 A1* | 9/2015 | Bondesen | G06Q 20/367 705/44 |
| 2015/0348032 A1* | 12/2015 | Ioveva | G06Q 20/2295 705/44 |
| 2016/0086176 A1 | 3/2016 | Silva Pinto et al. | |
| 2016/0253669 A1* | 9/2016 | Yoon | G06Q 20/327 705/75 |
| 2018/0285875 A1 | 10/2018 | Law et al. | |

FOREIGN PATENT DOCUMENTS

| | | |
|---|---|---|
| KR | 101919590 B1 | 2/2019 |
| WO | 2005003907 A2 | 1/2005 |
| WO | 2016134016 A1 | 8/2016 |
| WO | 2017209767 A1 | 12/2017 |

OTHER PUBLICATIONS

PCT/US2020/042724 , "International Search Report and Written Opinion", Nov. 5, 2020, 11 pages.
"Two-factor authentication for Apple ID", https://support.apple.com/en-inHT204915, Dec. 8, 2020, 9 pages.
Application No. EP20839951.9 , Extended European Search Report, Mailed on Aug. 16, 2022, 9 pages.
Application No. CN202080051777.4 , Notice of Decision to Grant, Mailed on Nov. 9, 2024, 9 pages.
Application No. EP20839951.9 , Office Action, Mailed on May 7, 2025, 15 pages.
Application No. SG11202200133X , Written Opinion, Mailed on Sep. 30, 2024, 10 pages.

* cited by examiner

| Device Management | | | | | |
|---|---|---|---|---|---|
| Device | Device Name | Transacting Device? | Authenticating Device? | Authentication Method | Disable Device? | Device Communication Address |
| Smartphone | Joe's Phone | Yes | Yes | SMS One-time password | Yes/No | Phone number - 414-555-5555 |
| Tablet | Joe's Tablet | Yes | Yes | Username/ Password | Yes/No | IP Address: 172.16.254.1 |
| Laptop | Joe's Laptop | Yes | No | N/A | Yes/No | IP Address: 172.16.295.1 |
| TV | Livingroom TV | Yes | No | N/A | Yes/No | IP Address: 172.16.273.1 |

Edit  DELETE

| Device Type | Device Name | Consumer Email/Phone | Authentication Factor | Channel | Wallet Name (Optional) | Authentication Type | Geolocation | Merchant Name/Location | Amount | Device Last Used | Device Last Edited |
|---|---|---|---|---|---|---|---|---|---|---|---|
| Mobile | Joe's Phone | joe123@mail.com | Fingerprint | QR | X-Pay | X-Mobile App w/ QR | Foster City | Merchant X Foster City | $5.99 | 7/6/20 13:45 | 4/12/20 23:04 |
| Tablet | Joe's Phone | joe123@mail.com | Pattern | Remote | N/A | Browser | Foster City | Merchant Y Foster City | $22.99 | 7/5/20 8:36 | 12/7/19 14:16 |
| Laptop | Joe's Laptop | joe123@mail.com | Joe's phone (Fingerprint) | Remote | N/A | Browser | Foster City | Merchant Z Foster City | $125.99 | 7/2/20 9:03 | 1/12/20 10:20 |

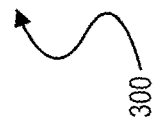

FIG. 3

CONFIRM ORDER

PAY WITH

Card...1234

SHIP TO
Alex Jones
1000 Main Street
San Francisco, CA 94105

YOUR ORDER

| | |
|---|---|
| COCOA TRUFFLES X1 | $15.00 |
| CLASSIC SET X 1 | $24.00 |
| SUBTOTAL | $39.00 |
| SHIPPING | FREE SHIPPING |
| ORDER TOTAL | $39.00 |

CONFIRM ORDER

Back  Forward  Home  Bookmarks  Tabs

400E

SYSTEM AND METHOD UTILIZING CHAIN OF TRUST

CROSS-REFERENCE TO RELATED APPLICATIONS

This application is a National Stage of International Application No. PCT/US2020/042724, filed on Jul. 20, 2020, which claims priority to provisional patent application 62/875,771 filed on Jul. 18, 2019, which is herein incorporated by reference in their entirety for all purposes.

BACKGROUND

Single users often operate multiple user devices. For example, a user may own many electronic user devices such as phones, computers, wearable devices, vehicles and household appliances. In the Internet of Things era, the user may wish to have his user devices gain access to certain resources such as data stored on secure servers, secure locations, and goods and services. For example, a user may store secure data such as a personal schedule on a server. Various user devices of the user may need to access that schedule in order to perform certain tasks. For example, the user's mobile phone may need to access the schedule to inform the user of any scheduling conflicts or upcoming meetings. In another example, the user's thermostat may need to access the user's schedule in order to adjust the temperature of the user's home according to when the user will be at home. In another example, the user may wish to use the user's mobile phone to make a purchase of goods at an e-commerce merchant. The user may also have a washing machine that may also wish to purchase goods at the same e-commerce merchant.

However, providing each user device with the ability to access resources is cumbersome and difficult. For example, the user's user devices may not have appropriate interfaces to receive access credentials such as passwords, account numbers, and the like. For example, a typical washing machine does not have a built in interface to receive a password from the user. Further, even if such user devices did have the ability to receive and store credentials from a user, it would be very cumbersome for the user to enter such credentials into each and every device that she or he uses. Further, if the credentials are sensitive (e.g., a password), storing the credentials in each and every user device that a user operates can expose those sensitive credentials to hacking and unauthorized use.

Embodiments of the invention address these and other problems, individually and collectively.

SUMMARY

One embodiment includes a method comprising: receiving, by a resource provider computer from a first user device associated with a user, a transaction request comprising a credential or a token; identifying, by the resource provider computer, a second user device associated with the credential; transmitting, by the resource provider computer to the second user device, an authentication request corresponding to the first user device; receiving, by the resource provider computer from the second user device, an authentication response, the authentication response comprising an indication that the first user device is authenticated; and transmitting, by the resource provider computer, an authorization request message to an authorizing entity computer in response to receiving the indication that the first user device is authenticated.

Another embodiment includes a resource provider computer comprising: one or more processors; and one or more non-transitory computer-readable media comprising code, when executed by the one or more processors, cause the resource provider computer to perform a method comprising: receiving, from a first user device associated with a user, a transaction request comprising a credential or a token; identifying a second user device associated with the credential; transmitting, to the second user device, an authentication request corresponding to the first user device; receiving, from the second user device, an authentication response, the authentication response comprising an indication that the first user device is authenticated; and transmitting an authorization request message to an authorizing entity computer in response to receiving the indication that the first user device is authenticated.

Another embodiment includes a method comprising: receiving, by a processing network computer from a resource provider computer, an authorization request comprising a token, a first identifier for a first user device and a second identifier for a second user device, the authorization request transmitted by the resource provider computer in response to receiving an indication from the second user device that the first user device is authenticated; receiving, by the processing network computer from a token service provider computer, a credential associated with the token; replacing, by the processing network computer, the token in the authorization request with the credential; transmitting, by the processing network computer, the authorization request comprising the credential to an authorizing entity computer; and maintaining, by the processing network computer, an association between the credential, the first identifier for the first user device, and the second identifier for the second user device.

Another embodiment includes a processing network computer that is programmed to perform the above-described method.

These and other embodiments are described in further detail below.

BRIEF DESCRIPTION OF THE DRAWINGS

FIG. 2 depicts an exemplary user interface for managing multiple user devices associated with a user, according to some embodiments.

FIG. 3 depicts an exemplary user interface for presenting transaction details, according to some embodiments.

DETAILED DESCRIPTION

Figure 1:
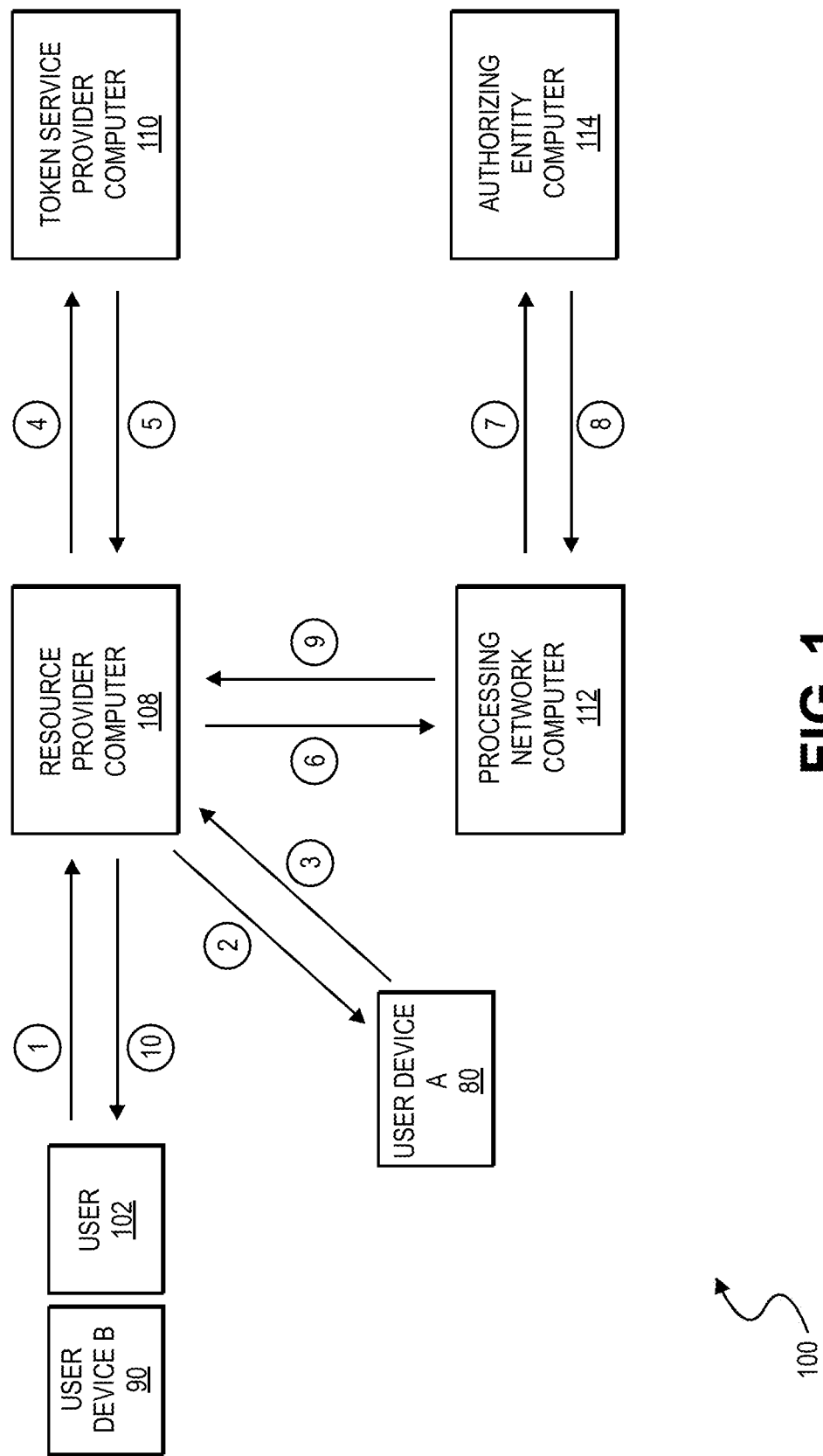
FIG. 1 shows a block diagram of a system and method for authenticating a new user device, according to some embodiments.
Figure 4A:
FIG. 4 depicts an exemplary set of user interfaces for authenticating a user device from a user device already associated with a user, according to some embodiments.
Figure 4B:
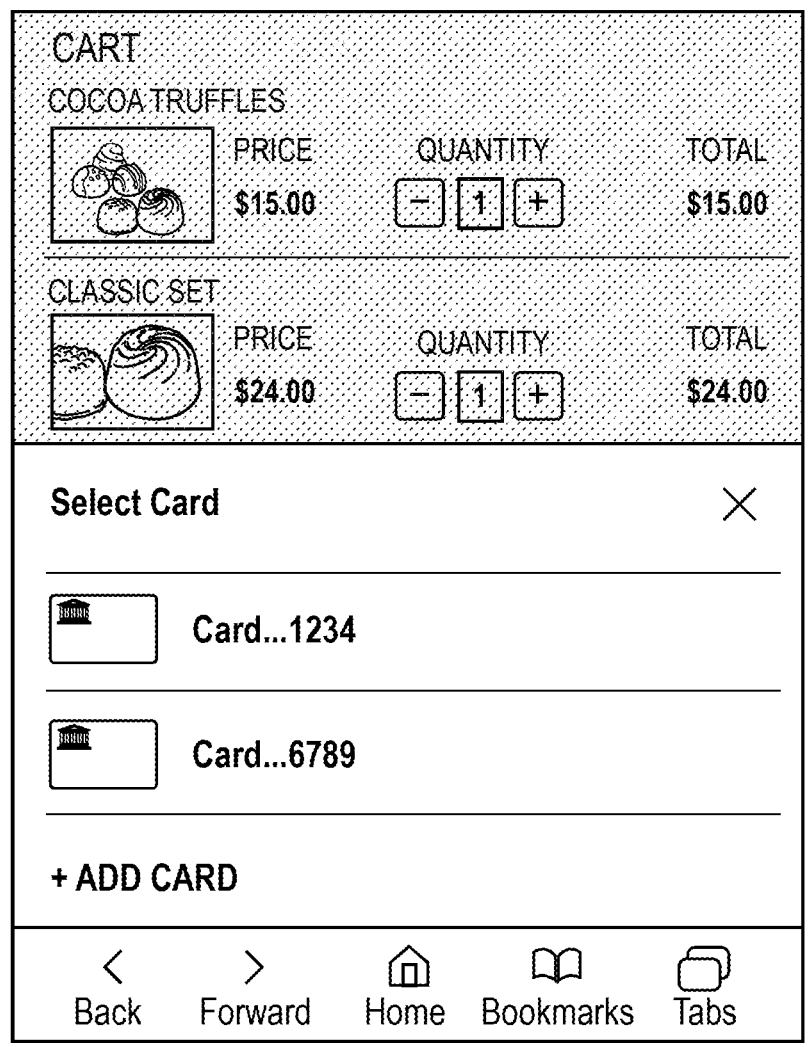
Figure 4C:
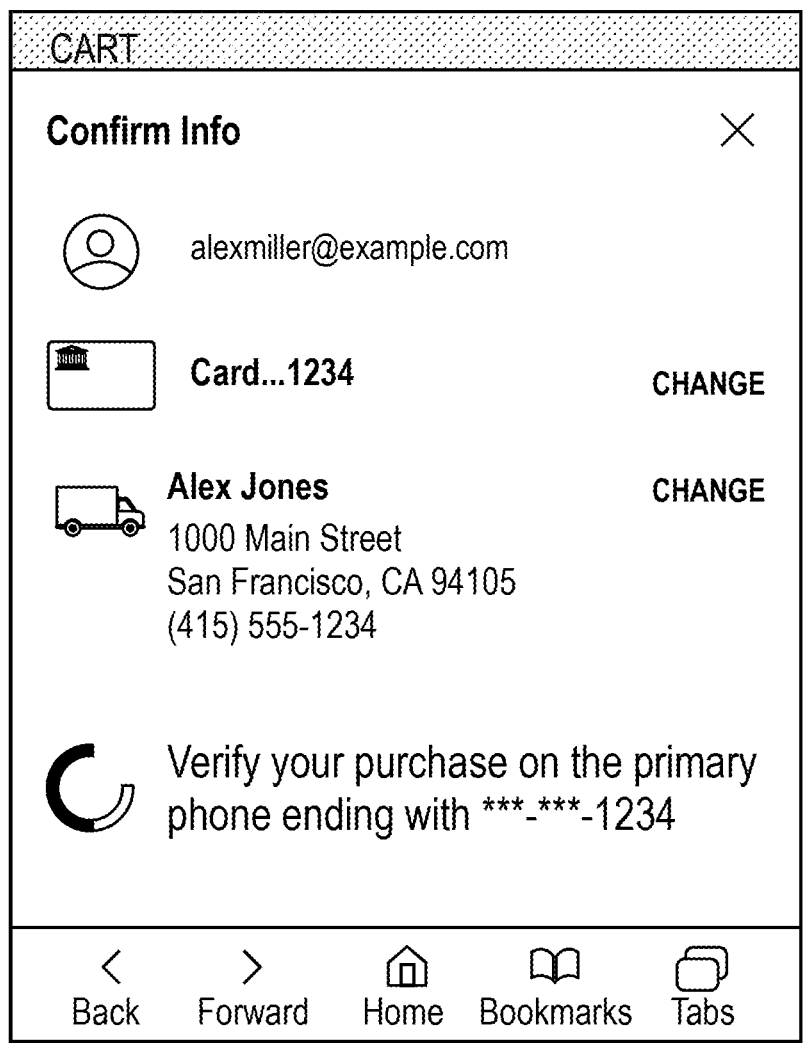
Figure 4D:
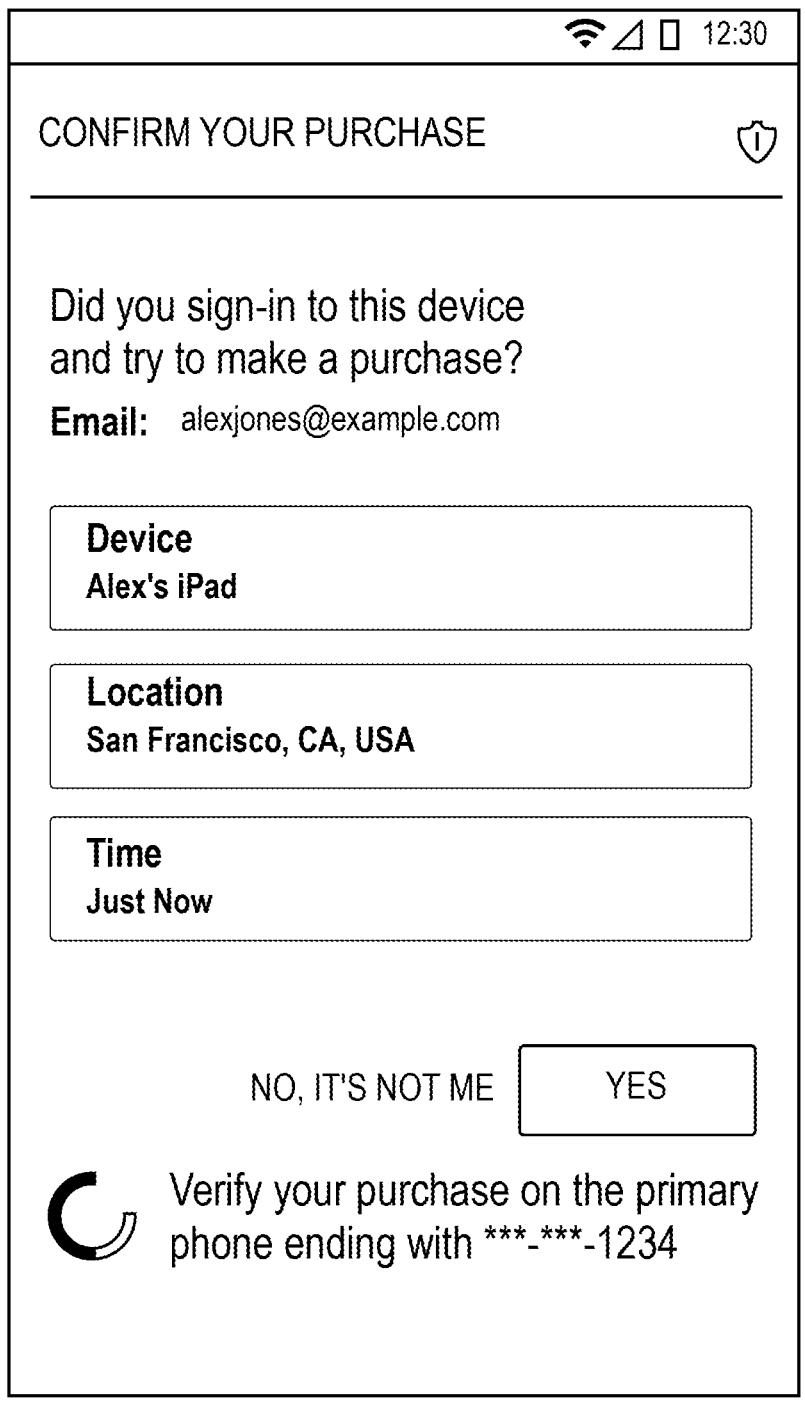
Figure 4E:

Prior to discussing specific embodiments of the invention, some terms may be described in detail.

A "user device" may comprise any suitable electronic device that may be operated by a user. In some embodiments, a user device may provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, appliances (household appliances), vehicles (e.g., electric cars), tablet computers, desktop computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "credential" may be any suitable information that serves as reliable evidence identity. A credential may be a string of numbers, letters, or any other suitable characters, as well as any object or document that can serve as confirmation. Examples of credentials include usernames, passwords, PIN codes, and the like. A credential can also be a device identifier that is associated with a user device operated by a user. Credentials may also include payment credentials, access credentials, and the like.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization," also known as a "token exchange," is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, and improve transaction security.

A "token provider computer" can include an electronic device that services payment tokens and/or cryptograms. In some embodiments, a token provider computer can facilitate requesting, determining (e.g., generating) and/or issuing (provisioning, transmitting, etc.) tokens and/or cryptograms, as well as maintaining an established mapping of tokens to primary account numbers (PANs) and/or cryptograms in a repository. In some embodiments, the token provider computer may establish a token assurance level for a given token to indicate the confidence level of the token to PAN binding. The token provider computer may include or be in communication with a token data store wherein the generated tokens are stored. The token provider computer may support token processing of payment transactions submitted using tokens by de-tokenizing the token to obtain the actual PAN. In some embodiments, a token provider computer may include a tokenization computer alone, or in combination with other computers such as a processing network computer.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token request message" may be an electronic message for requesting a token or cryptogram. A token request message may include information usable for identifying a payment account or digital wallet, and/or information for generating a payment token and/or a cryptogram for the payment token. For example, a token request message may include payment credentials, mobile device identification information (e.g. a phone number or MSISDN), a digital wallet identifier, information identifying a tokenization service provider, a merchant identifier, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may have a zero dollar amount in an authorization amount field. As another example, the token request message may include a flag or other indicator specifying that the message is a token request message.

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may have a zero dollar amount in an authorization amount field. As another example, the token response message may include a flag or other indicator specifying that the message is a token response message.

A "user" may include an individual or a device. In some embodiments, a user may be associated with one or more personal accounts and/or user devices. The user may also be referred to as a cardholder, account holder, or consumer in some cases.

A "resource provider" may be an entity that can provide a resource such as goods, services, information, and/or access. Examples of resource providers include merchants, access devices, secure data access points, secure location access points, etc. A "merchant" may typically be an entity that engages in transactions and can sell goods or services, or provide access to goods or services.

A "resource provider computer" may be any communication device operated by, or on behalf of, of a resource provider. A resource provider computer may host an application running on a user device.

An "acquirer" may typically be an entity (e.g., a commercial bank) that has a business relationship with a particular resource provider (e.g., a merchant) or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a processing network computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code, which may be a code that a credit card issuing bank returns in response to an authorization request message in an electronic message (either directly or through the processing network computer) to the merchant's access device (e.g. POS equipment) that indicates approval of the transaction. The code may serve as proof of authorization. As noted above, in some embodiments, a processing network computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "appliance" may be an object comprising a data processor that can communicate with other devices. The appliance may include a memory element coupled to the processor, and a computer readable medium coupled to the processor. The computer readable medium may include code that is executable by the processor, for implementing methods described herein. In some embodiments, an appliance can be a device that is designed to perform a specific task. For example, an appliance can be a refrigerator where the primary function of the refrigerator is to keep food preserved or a thermostat where the primary function of the thermostat is to control the temperature within a dwelling. In some cases, an appliance may be a machine that can perform a domestic task. For example, the appliance may be a thermostat, washing machine, a drying machine, a microwave, a toaster, a blender, a refrigerator, or other device that may be found around a residence. However, embodiments are not so limited, as the appliance may also be any other type of suitable device with wireless communication capabilities. Other examples of appliances include televisions, certain mobile devices such as wearable devices (e.g., smart watches, fitness bands, jewelry, etc.), and automobiles with remote communication capabilities.

FIG. 1 shows a block diagram of a system and method for authenticating a new user device, according to some embodiments. The system 100 includes a user device A, user device B, a resource provider computer 108, a token provider computer 110, a processing network computer 112, and an authorizing entity computer 118. In some embodiments, the system 100 may further include a transport computer (not depicted) operated by an acquirer. The transport computer would process and relay communications between the resource provider computer 108 and the processing network computer 112. Each of these systems and computers may be in operative communication with each other. For simplicity of illustration, a certain number of components are shown in FIG. 1. However, it should be appreciated that embodiments of the invention may include more than one of each component. In addition, some embodiments of the invention may include fewer than or greater than all of the components shown in FIG. 1.

The components in FIG. 1 may communicate via any suitable communication medium using any suitable communications protocol. Suitable communications medium may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the components of FIG. 1 may be transmitted using a communications protocols such as, but not limited to, File Transfer Protocol (FTP); HyperText Transfer Protocol (HTTP); Secure Hypertext Transfer Protocol (HTTPS); Secure Socket Layer (SSL), ISO (e.g., ISO 8583) and/or the like.

User devices A and B (80, 90) may each include a processor and a computer readable medium coupled to the processor, the computer readable medium comprising code, executable by the processor for performing the functionality described herein. User devices A and B (80, 90) may each be capable of communicating with the resource provider computer 108 via a communications medium in order to conduct a transaction with a resource provider (e.g., a merchant, a server that is a gateway to a data repository) associated with the resource provider computer 108. In some embodiments, the user devices A and B (80, 90) may be in communication with resource provider computer 108 through applications (e.g., a web browser, a merchant hosted application, etc.) operating on the respective user devices. The application can be stored in a memory element of user device A and/or user device B and be configured to retrieve, present, and send data across a communications network (e.g., the Internet) to and/or from resource provider computer 108. In some embodiments, a user device (e.g., user device B) may not have a user interface such as an alphanumeric keypad or keyboard that allows the user 102 to interact with the application by inputting specific data. For example, user device B may be a smart household appliance with buttons that enable user 102 to initiate a transaction, but without a screen for the user 102 to input user specific data such as a payment card number.

Resource provider computer 108 may include any suitable computational apparatus operated by a resource provider (e.g., a merchant). The resource provider computer 108 may include a processor and a computer readable medium coupled to the processor, the computer readable medium comprising code, executable by the processor for performing the functionality described herein. Examples of resource provider computer 108 may include a web server computer that may host one or more websites associated with the resource provider. In some embodiments, the resource provider computer 108 may be configured to send/receive data (e.g., a token request message, a token response message, etc.) to/from the token provider computer 110. In some embodiments, the resource provider computer 108 may also be configured to send/receive data (e.g., an authorization request message, an authorization response message, etc.) to/from the processing network computer 112.

Token provider computer 110 may include any suitable computational apparatus operated by a token provider. Token provider computer 110 may include a processor and a computer readable medium coupled to the processor, the computer readable medium comprising code, executable by the processor for performing the functionality described herein. Token provider computer 110 can facilitate requesting, determining (e.g., generating) and/or issuing (provisioning, transmitting, etc.) tokens and/or cryptograms, as well as maintaining an established mapping of tokens to information associated with a user (e.g., a PAN, a cryptogram, etc.) in a repository (e.g. token vault). The token provider computer 110 may include or be in communication with a token vault (e.g., one or more data stores) where the generated tokens and/or cryptograms are stored. The token provider computer 110 may support token processing of transactions submitted using tokens by de-tokenizing the token to obtain underlying data (e.g., the PAN). In some embodiments, the token provider computer 114 may be configured to send/receive data to/from the resource provider computer 108, the processing network computer 112, and/or the authorizing entity computer 114.

Processing network computer 112 may be a network that includes or operates at least one server computer used for transaction processing. Processing network computer 112 may include a processor and a computer readable medium coupled to the processor, the computer readable medium comprising code, executable by the processor for performing the functionality described herein. Processing network computer 112 may include data processing subsystems, networks, and operations used to support and deliver authorization services, exception file services, and clearing and settlement services. An exemplary processing network computer 112 may include a network (e.g., VisaNet™) that is able to process credit card transactions, debit card transactions, and other types of commercial transactions. In particular, processing network computer 112 may be part of an integrated payments system (Integrated Payments system) which processes authorization requests and a Base II system, which performs clearing and settlement services. In the example depicted in FIG. 1, processing network computer 112 may provide transaction authorization and clearing and settlement services between a transport computer (not shown) and the authorizing entity computer 114 for standard payment transactions. In some embodiments, the processing network computer 112 may be configured to send/receive data to/from resource provider computer 108, token provider computer 110, and/or authorizing entity computer 114.

Authorizing entity computer 114 authorizes transactions. In some embodiments, it can be associated with an issuer (e.g., a bank) which issues and maintains user accounts for a user (e.g., the user 102). The authorizing entity may also issue access device such as payment devices for a user account (e.g., a consumer account). Payment devices may include credit cards and debit cards. In some embodiments, authorizing entity computer 114 may be configured to send/receive data to/from the processing network computer 112. In some embodiments, the authorizing entity computer 114 may authorize access to secure data or a secure location.

In the example provided in FIG. 1, the resource provider operating the resource provider computer 108 may have previously associated the user 102 with the user device A 80. The resource provider can associate the user device A 80 and the user 102 via an enrollment process performed by the resource provider computer 108. The resource provider computer 108 may also store a token associated with the user 102 and/or user device A 80, which may have been obtained from the token service provider computer 110 via a previous transaction performed between the user device A 80 and the resource provider computer 108. In some embodiments, the token service provider 110 can also store an association between a PAN (primary account number) of the user 102, and the token. In some embodiments, the resource provider computer previously associated user device B 90 with the user 102 (e.g., through an enrollment process), but user device B may have been or be authorized to conduct transactions on its own.

In some embodiments, user 102 may enroll one or more user devices with the resource provider computer 108 prior to initiating a transaction. For example, the user 102 may log on to a user account provided by the resource provider computer 108 to manage device authentication (e.g., as depicted in FIG. 2). The user 102 then enters data about the user device that is being enrolled (e.g., user device A). The data may include a user device identifier. The user 102 may also enter data regarding whether or not the user device can be used to authenticate other devices. In some embodiments, the user 102 can also enter credentials to be associated with the user device. In other embodiments, the resource provider computer 108 may already have stored credentials from the user 102. Further, the resource provider computer 108 can create a mapping between the user device identifier and the credentials.

The user device identifier can be in any suitable form. For example, the user device identifier can be a chosen name for the user device. It could alternatively be a device number (e.g., a serial number, a phone number, etc.).

At step 1, the user 102 may attempt to transact with the resource provider operating the resource provider computer 108 using the user device B 90. In this example, the resource provider operating the resource provider computer 108 does not know that user device B 80 is associated with the user 102. For example, user device B can be a new device recently purchased by the user 102. The user 102 may utilize a web browser or any suitable application executing on the user device B to navigate to a web page hosted by the resource provider computer 108. In other embodiments, instead of being an Internet accessible server computer, the resource provider computer 108 may be the form of an access device such as a POS (point of sale) terminal.

The user 102 may use user device B 90 to initiate a transaction (e.g., a payment transaction) via any suitable interface (e.g., a Web page) provided by the resource provider computer 108. In some embodiments, the user 102 may log on to a user account provided by the resource provider computer 108. The user 102 may enter his payment credentials into the resource provider computer 108 manually, or the payment credentials may already be on file with the resource provider computer 108.

In some embodiments, the credentials that are transmitted by user device B 90 may include a credential such as an identifier of user device A 80 (e.g., a phone number or device ID associated with user device A 80). In other embodiments, the credential may alternatively or additionally include an identifier for user device B 90. In yet other embodiments, the credential may be a primary account identifier such as primary account number. In yet other embodiments, a token can be provided instead of a credential.

In some embodiments, user device B 90 may not have a user interface to allow the user 102 to navigate to a web page hosted by the resource provider computer 108. For example, user device B 90 may be a household appliance with IoT capabilities for reordering cleaning supplies. User device B 90 could alternatively be a fitness band which does not have a data entry screen. User device B 90 can then initiate a transaction in response to an action from the user 102 (e.g., pushing a button), without first accessing the web page hosted by the resource provider computer 108. In such a situation, the user may have previously contacted the resource provider computer 108 using a different user device. Using the different user device, the user may have provided the identifier for user device B 90 in a profile along with the identifier for user device A. The profile may also include a secure credential such an account identifier, or a token. The user device B 90 may have also been preprogrammed with the address (e.g., an IP address) of the resource provider computer 108. Upon receipt of the user device identifier for user device B 90, the resource provider computer may look up the communication address of user device A 80 and communicate with user device A 80.

The resource provider computer 108 may consult a mapping stored in memory that indicates an association between the user's payment credentials, and one or more user devices associated with the user 102. This information may be stored in a user profile in the resource provider computer 108. In some embodiments, the mapping may further indicate whether each user device already associated with the user 102 is an authenticating device. The user 102 may have previously identified user device A 80 as an authenticating device for the user. The authentication device may be used to assist in the authentication of another device. As a non-limiting example, the mapping may indicate that the payment credential provided at step 1 is currently associated with user device A 80, which has been previously identified by the user 102 to the resource provider computer 108 as an authenticating device.

At step 2, the resource provider computer 108, may transmit an authentication request to the user device A 80. The authentication request may be in any suitable form. For example, the authentication request can comprise a one-time password that is sent via an SMS message or email. In other embodiments, the authentication request may be a request that facilitates a consumer device cardholder verification method (CDCVM). For example, the authentication request may request a biometric such as a biometric fingerprint of the user from the user device A 80.

In some embodiments, the authentication request may include an identifier of user device B 90. In this way, the user 102 of user device A 80 can be informed that it needs to authenticate user device B 90. The identifier for user device B 90 may have been obtained by the resource provider computer 108 in step 1, or may have been obtained by the resource provider computer 108 at an earlier time. For example, a name associated with the user device B 90 (e.g., Alex's tablet) may be utilized as an identifier for user device B.

In some embodiments, additional information may be included in the authentication request. For example, a location associated with the user device B 90 (e.g., determined by the resource provider computer 108, included in the data sent at step 1, etc.), a time associated with a transmission time of the data sent at step 1, or any suitable data associated with the user device B 90, the user 102, and/or the transaction (e.g., price, location, item identifiers for items being purchased, etc.) may be sent in the authentication request. The user 102 may be presented any suitable combination of the data sent in the authentication request using a display of user device A 80. In some embodiments, the user 102 may be presented an option to authenticate the user device B 90.

At step 3, the user 102 may indicate whether or not the user device B 90 is authenticated, and an authentication response may be sent to the resource provider computer 108 that includes this indication. If the authentication response indicates that the user device B is not authenticated, then the resource provider computer 108 may reject the transaction and, in some cases, notify the user 102 via user device B 90 that the transaction was unsuccessful. If the authentication response indicates that the user device B 90 is authenticated, then the resource provider computer 108 may proceed to step 4.

At step 4, the resource provider computer 108 may transmit a token request message to the token service provider computer 110 to request at least a cryptogram for the transaction. In some embodiments, the token request message may include an identifier for user device A 80, and an identifier for user device B 90. In some embodiments, the token request message may include data such as a payment credential of the user 102. The token service provider computer 110 may consult a mapping to verify that at least one device (e.g., the user device A) has been previously associated with the payment credential. For example, the token service provider computer 110 may identify from the mapping that an identifier of user device A 80 has been previously associated with the payment credential provided at step 4. If the token service provider computer 110 identifies that such an association exists, the token service provider computer 110 may further associate the payment credential with the identifier of user device B 90.

The token service provider 110 may execute any suitable operations for generating a cryptogram. In some embodiments, the cryptogram is a token authentication verification value (TAVV). In some embodiments, the cryptogram can include one or more of (in any combination) data about the authentication method used in the authentication request and response, an account identifier, a token, a transaction channel indicator, an expiration date, etc., in encrypted form. If the cryptogram generation is successful, the token service provider computer 110 may provide the cryptogram in a token response message to the resource provider computer 108 by transmitting the token response message to the resource provider computer 108.

In some embodiments, the cryptogram (e.g., TAVV) may be associated with a specific transaction mode or transaction channel. For example, in some embodiments, one TAVV may indicate that a particular token is valid for a channel such as an electronic commerce channel. Another TAVV may be used with that same token but may be only valid in another channel such as a channel involving a contactless, proximity type transaction. If the TAVV is does not match the channel in which the transaction is conducted, then the transaction may be invalid. The TAVV can be used to limit the risk of man-in-the-middle attacks or fraudulent use of tokens, since tokens can only be used if they are accompanied by a correct TAVV.

At step 5, the resource provider computer 108 may receive the token response message including the cryptogram generated by the token service provider computer 110. In some embodiments, the resource provider computer 108 may associate the payment credential with the user device B 90 upon receipt of this cryptogram, or at any suitable time.

At step 6, the resource provider computer 108 may generate an authorization request message including any suitable data such as transaction data (e.g., merchant name, merchant location, price, the token, the cryptogram, a device identifier for user device A 80, a device identifier for user device B 90, and the like). In some embodiments, identifiers for both the user device A 80 and the user device B 90 may be included in this authorization request message. In other embodiments, the identifier for the user device A 80 may be included in the message despite the fact the transaction was initiated using the user device B 90. In yet other embodiments, the identifiers for user device A 80 and user device B 90 are not present in the authorization request message. After generating the authorization request message, the resource provider computer 108 may transmit the authorization request message to the processing network computer 112.

At step 7, the processing network computer 112 may receive the authorization request message and transmit the authorization request message to the authorizing entity computer 114. In some embodiments, prior to transmitting the authorization request message to the authorizing entity computer 114, the processing network computer may conduct a number of operations. For example, the processing network computer 112 may provide the token to the token service provider computer 110 to exchange the token for the associated real payment credential (e.g., a PAN). The payment credential may then replace the token in the authorization request message sent to the authorizing entity computer 114. In another example, the processing network computer 112 may also maintain a mapping between the token, the payment credential corresponding to the token, and one or more user devices associated with the token and/or payment credential. In some embodiments, when the authorization request message includes identifiers for both the user device A 80 and the user device B 90, the processing network computer 112 may associate the identifier for the user device B 90 with the token and/or payment credential.

The authorizing entity computer 114 may receive the authorization request message from the processing network computer 112. In some embodiments, if the token is included in the authorization request message rather than the payment credential, the authorizing entity computer 114 may request the payment credential from the token service provider computer 110 using the token. Once received, the authorizing entity computer 114 may use the payment credential to verify that the account associated with the user 102 and managed by the authorizing entity computer 114 has sufficient funds to conduct the transaction. The authorizing entity computer 114 may also perform an desired fraud or security checks (e.g., checking the payment credential against a negative list of account numbers associated with fraud). After the authorizing entity computer 114 performs any desired authorization processing, it may grant or deny the authorization request. In some embodiments, the authorizing entity computer may also maintain a mapping between the token, the payment credential corresponding to the token, and one or more user devices (e.g., the user device A 80) associated with the token and/or payment credential. In some embodiments, when the authorization request message includes identifiers for both user device A 80 and user device B 90, the processing network computer 112 may associate the identifier for user device B 90 with the token and/or payment credential. User device A 80 may have been previously associated with the token and/or payment credential as a result of a previous transaction, or may have previously been provided by the user to the processing network computer 112.

At step 8, the authorizing entity computer 114 may transmit an indication that the transaction was granted or denied in an authorization response message to the processing network computer 112. In some embodiments, the authorizing entity computer 114 may transmit the authorization response message with the payment credential and any suitable transaction data received in the request at step 7. In some embodiments, the authorizing entity computer 114 may transmit the token in lieu of the payment credential. In some embodiments, the authorization response message may further include an indication that the user device B 90 was successfully associated with the payment credential.

At step 9, the processing network computer 112 may transmit the authorization response message to the resource provider computer 108. If the payment credential is included in the authorization response message received from the authorizing entity computer 114, the processing network computer 112 may replace the payment credential with the token before transmission. In some embodiments, the processing network computer 112 may associate user device B 90 with the payment credential and store this association in its mapping based at least in part on receiving an indication that the user device B 90 was successfully associated with the payment credential at the authorizing entity computer 114.

At step 10, the resource provider computer 108 may provide an indication to the user device B 90 or the user 102 that the transaction was successful or unsuccessful. This indication may be presented at the user device B utilizing any suitable user interface. For example, the indication may be presented via the web page hosted by the resource provider computer 108.

At a later point in time, a clearing and settlement process can occur between the authorizing entity computer 114, the processing network computer, and a transport computer (not shown) associated with the resource provider computer 108.

In some embodiments, after user device B 90 is associated with the payment device, subsequent transactions conducted with user device B 90 do not require authentication by user device A 80 or another user device. For example, user device B 90 can send a second transaction request to the resource provider computer 108 with the credential of the user 102 (e.g., the identifier for the user device B 90 and/or the PAN). The resource provider computer 108 can determine that user device B 90 was previously authenticated, and may transmit a second authorization request message to the authorizing entity computer 114. In some embodiments, determining that user device B 90 is authenticated comprises sending an authentication request to user device B 90 and receiving an authentication response from user device B 90.

It should be appreciated that although the example of FIG. 1 describes separate mappings maintained by the resource provider computer 108, the processing network computer 112, and the authorizing entity computer 114, it may be the case that some subset of those computers maintain separate mappings (e.g., the resource provider computer 108 and the authorizing entity computer 114). In some embodiments, a single mapping may be maintained in a location accessible to any suitable combination of those computers. By way of example, a service provider computer (not depicted) may provide one or more user interfaces (e.g., the user interfaces of FIGS. 2 and/or 3 described below) for managing a number of user devices associated with the user. The service provider computer, the resource provider computer 108, the processing network computer 112, and/or the authorizing entity computer 114 may each be configured to modify the mapping in the manner described above and/or based on user input via the one or more user interfaces provided by the service provider computer.

FIG. 2 depicts an exemplary user interface for managing multiple user devices associated with a user, according to some embodiments. The user interface depicted in FIG. 2 may be provided by the service provider computer, the resource provider computer, the processing network computer 112, and/or the authorizing entity computer 114 of FIG. 1.

In some embodiments, the interface may provide an edit option and/or a delete option. Upon selection of the edit option, the user may edit the fields depicted. In some embodiments, data fields of the interface (e.g., device, device name, transacting device, authenticating device, authentication method, disable device, and/or the like) may present the data fields corresponding to the mapping(s) maintained at the service provider computer, the resource provider computer, the processing network computer 112, and/or the authorizing entity computer 114 as described above in connection with FIG. 2. In some embodiments, the device data field may correspond to any suitable device identifier (e.g., a serial number, MAC address, IP address, or any suitable identifier unique to a device). Edits made to the data fields within the user interface may be utilized to update the mapping(s) maintained by the service provider computer, the resource provider computer, the processing network computer 112, and/or the authorizing entity computer 114 discussed above in connection with FIG. 1. Using the user interface depicted in FIG. 2, the user may designate which device(s) is an authenticating device (e.g., a device that is allowed to authenticate other devices).

A device added to the mapping at one of the computers discussed in connection with FIG. 1 may add the device to the list. The user may then edit the data fields of the device to enable the device to act as an authenticating device. The authentication method data field can identify a default authentication method to use for each authenticating device. Exemplary authentication methods include username and password, consumer device cardholder verification methods (CDCVMs) with password, biometric data, etc., one-time passwords (OTPs) via SMS, email, etc., out-of-band authentication, and the like. The user may utilize the user interface depicted in FIG. 2 to edit the authentication method used for each authenticating device.

In some embodiments, when a new device is to be authenticated, the resource provider computer 108 of FIG. 1 may select any suitable number of authenticating devices to which an authentication request is sent. The user may also disable any suitable device associated with the user. Disabling the device may indicate that the device is not to be used to transact with and is also not to be utilized to authenticate other devices. Thus, if a transaction is initiated from the device, the resource provider computer 108 (or any suitable computer of FIG. 1) may reject the transaction when it is determined the device is currently disabled. In some embodiments, the user may manually enter additional devices and associated data fields and/or delete devices from the mapping at will. In deleting a device, a de-enrollment message can be sent to the resource provider computer 108 (or any suitable computer of FIG. 1) with an identifier of the desired device. The resource provider computer 108 can then remove the association between the device and the credentials of the user.

Communication device addresses (e.g., phone numbers, IP addresses, etc.) may also be present in the table in the user interface in FIG. 2.

FIG. 3 depicts an exemplary user interface for presenting transaction details, according to some embodiments. In some embodiments, the service provider computer, the processing network computer 112, and/or the authorizing entity computer 114 of FIG. 1 may provide the user interface of FIG. 3. The provider of the user interface of FIG. 3 may be the same provider or a different provider than the provider of the user interface of FIG. 2. The user interface of FIG. 3 may include the data fields depicted (e.g., device type, device name, consumer email/phone, authentication factor indicating a manner in which the device was authenticated, a channel, a wallet name, an application type, a location associated with the transaction, a merchant name/location, an amount, when the device was last used, and when the device information was last edited). However, it should be appreciated that more or less data fields may be included. Any suitable information related to a transaction, a user, a user device, a merchant, a merchant device may be presented via the user interface of FIG. 3.

In some embodiments, the user interface may be presented to user 102, or an operator of processing network computer 112 and/or authorizing entity computer 114. This can provide additional details to assist in identifying and addressing fraudulent activity, for example, by identifying devices that frequently change authentication methods.

FIG. 4 depicts an exemplary set of user interfaces for authenticating a user device from a user device already associated with a user, according to some embodiments. In some embodiments, the user interfaces 400A-400C and 400E may be presented at the user device B (e.g., a user device that was previously not associated with the user) while user interface 400D is presented at an authenticating device (e.g., the user device A of FIG. 1). In some embodiments, each of the user interfaces of FIG. 4 may be hosted by the resource provider computer 108 of FIG. 1, or any other suitable computer.

In at least one embodiment, the user may select an item. User interface 400A may depict a shopping cart including the item where the user may select an option to "checkout." In response to this selection, the user interface 400B may be provided at user device B to enable the user to select a payment credential to use to conduct the transaction. In response to a selection made at user interface 400B, the user interface 400C may be presented at user device B to indicate that the purchase (or user device B) is being verified at an authenticating device (e.g., the user device A).

The user interface 400D may be provided (e.g., by the resource provider computer 108 of FIG. 1) at user device A (e.g., or any suitable authenticating device associated with the payment credential and/or user). In some embodiments, the user interface 400D may be provided by an application which is brought to the foreground on the user device A. As another example, the user interface 400D may be provided in any suitable notification (e.g., a push notification, an alert, etc.) at the user device A. The user may authenticate the user device B by selecting the "yes" option (or an equivalent option), or the user may indicate that the user device B is not authentic (e.g., by selecting the "no, it's not me" option, or an equivalent) via the user interface 400D. The user interface 400E may be presented for a predetermined time and/or until an authentication response is received from the user device A indicating whether the user device B is authenticated.

If the user device B is authenticated, user interface 400E may be presented. User interface 400E may present purchase information corresponding to an item purchase. The user may select an option provided in user interface 400E to proceed with the transaction. If selected, the transaction may proceed in the manner described above in connection with FIG. 1.

Figure 5:
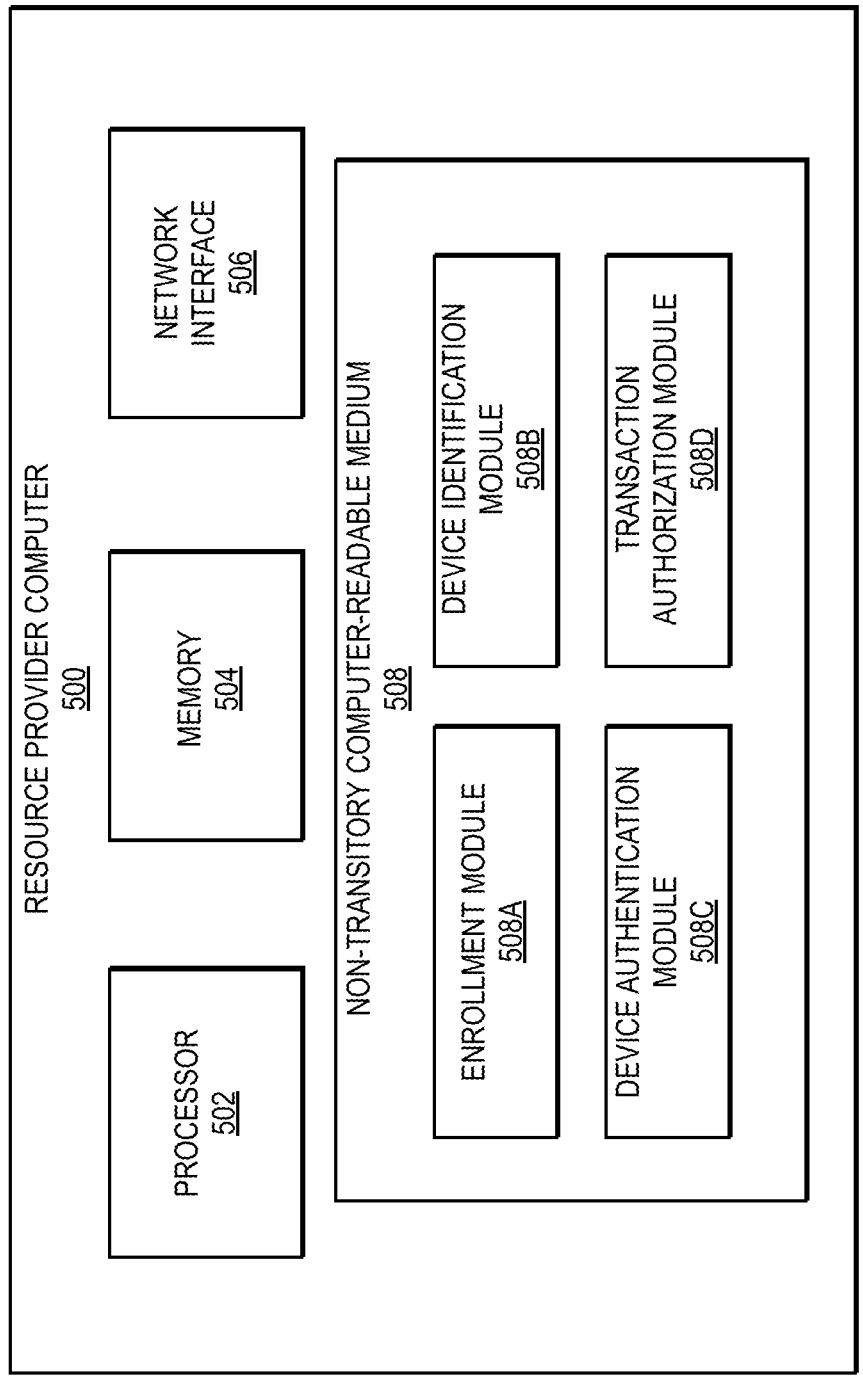
FIG. 5 shows a block diagram of a resource provider computer, according to some embodiments.

FIG. 5 shows a block diagram of a resource provider computer 500 (e.g., resource provider computer 108 of FIG. 1), according to some embodiments. The resource provider computer 500 includes a processor 502 and a memory 504, a network interface 506, and a computer-readable medium 508 operatively coupled to the processor 502. The computer-readable medium 508 may comprise an enrollment module 504A, a device identification module 504B, a device authentication module 504C, and a transaction authorization module 504D.

The enrollment module 508A may enroll users and user devices to form associations between users and user devices. The enrollment module 508A can, in conjunction with the processor 502, receive user information including credentials (e.g., payment credentials), identifying information (e.g., user name, address), and/or device information (e.g., MSISDN, device serial number, authentication capabilities). The enrollment module 508A, in conjunction with the processor 502, may then register the user. The enrollment module 508A, in conjunction with the processor 502, may also enroll new devices for existing users, remove enrolled devices, and change the status of previously enrolled devices (e.g., allowing a previously enrolled device to be used for authentication).

The device identification module 508B, in conjunction with the processor 502, can identify one or more devices associated with a particular credential or user device. The device authentication module 508B, in conjunction with the processor 502, can receive user information such as a credential or device identifier. The device authentication module 508B, in conjunction with the processor 502, then retrieves information about other devices registered to that user, including one or more devices that are authorized to perform authentication for the user. The device identification module 508B, in conjunction with the processor 502, may then select an enrolled device to complete the authentication.

The device authentication module 508C, in conjunction with the processor 502, can send and receive authentication messages (e.g., authentication request messages and authentication response messages). The device authentication module 508C, in conjunction with the processor 502, may determine a user device and an authentication method, such as a biometric authentication method or a one-time password authentication method, and may then send an authentication request message to the user device. The authentication request message may also include transaction data (e.g., an amount, a timestamp) and any other suitable data. The device authentication module 508C, in conjunction with the processor 502, then receives and verifies an authentication response message from the user device. The device authentication module 508C may also generate an indication that the user device has been authenticated.

The transaction authorization module 508D can send and receive authorization messages (e.g., authorization request messages and authorization response messages). The transaction authorization module 508D can send an authorization request message to an authorizing entity computer, the authorization request message including credentials (or a token), transaction data (e.g., an amount, a timestamp), and an indication that a user device associated with the transaction has been authenticated. The transaction authorization module 508D may also receive authorization response messages from the authorizing entity computer.

Figure 6:
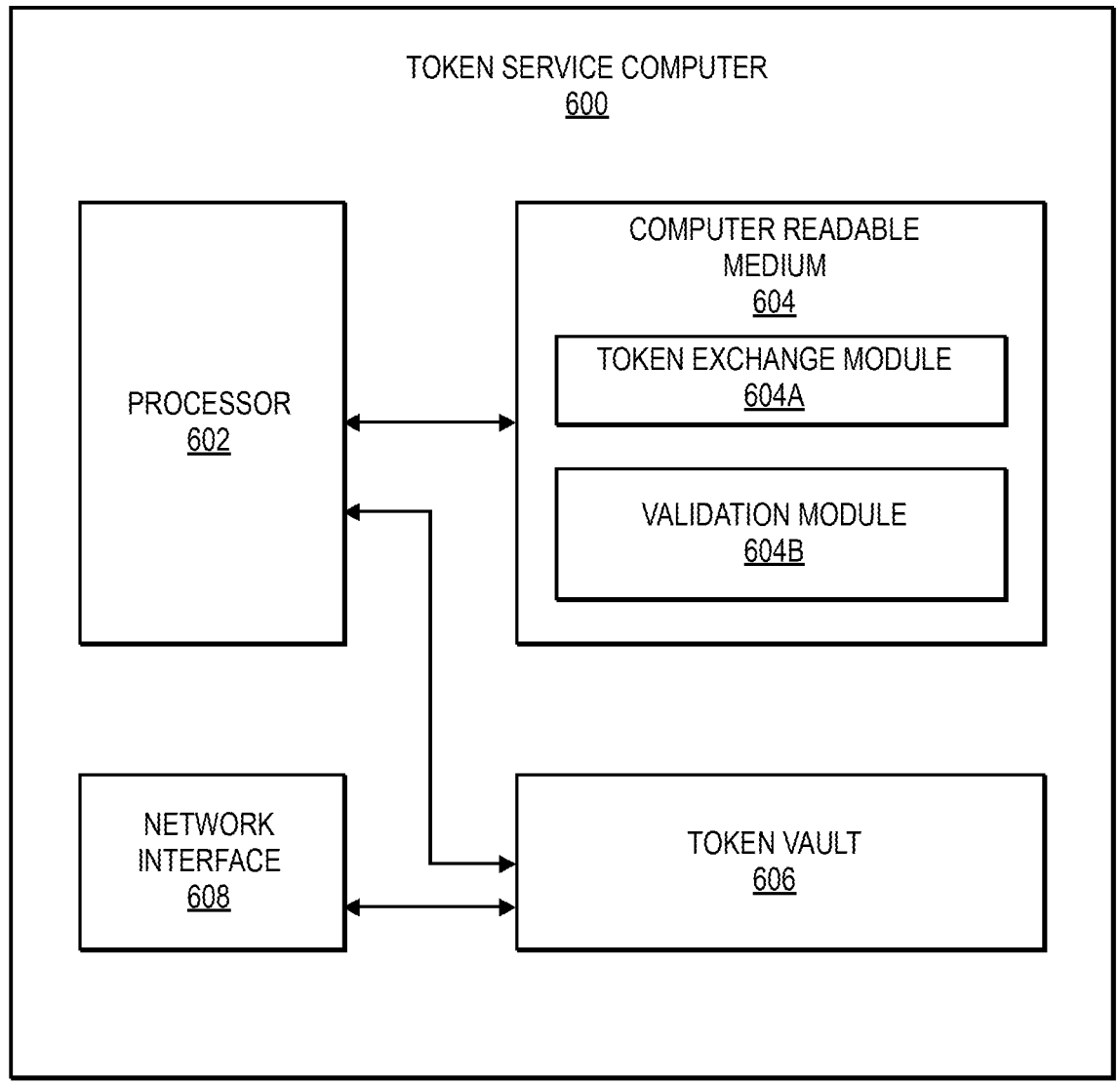
FIG. 6 shows a block diagram of a token service provider computer, according to some embodiments.

FIG. 6 shows a block diagram of a token service provider computer 600 (e.g., token service provider computer 110 of FIG. 1), according to some embodiments. The token service provider computer 600 includes a processor 602 and a computer readable medium 604, a token vault 606, and a network interface 608 coupled to the processor 602.

The computer readable medium 604 may comprise a token exchange module 604A and a validation module 604B.

The token vault 606 may store tokens and their associated credentials in a database. The token vault 606 may store data in a database such as an Oracle™ database.

The tokenization exchange module 604A may comprise code that causes the processor 602 to provide tokens. For example, the token exchange module 604A may contain logic that causes the processor 602 to generate a payment token and/or associate the payment token with a set of payment credentials. A token record may then be stored in a token record database indicating that the payment token is associated with a certain user or a certain set of payment credentials.

The validation module 604B may comprise code that causes the processor 602 to validate token requests before a payment token is provided. For example, validation module 604B may contain logic that causes the processor 602 to confirm that a token request message is authentic by decrypting a cryptogram included in the message, by confirming that the payment credentials are authentic and associated with the requesting device, by assessing risk associated with the requesting device.

Figure 7:
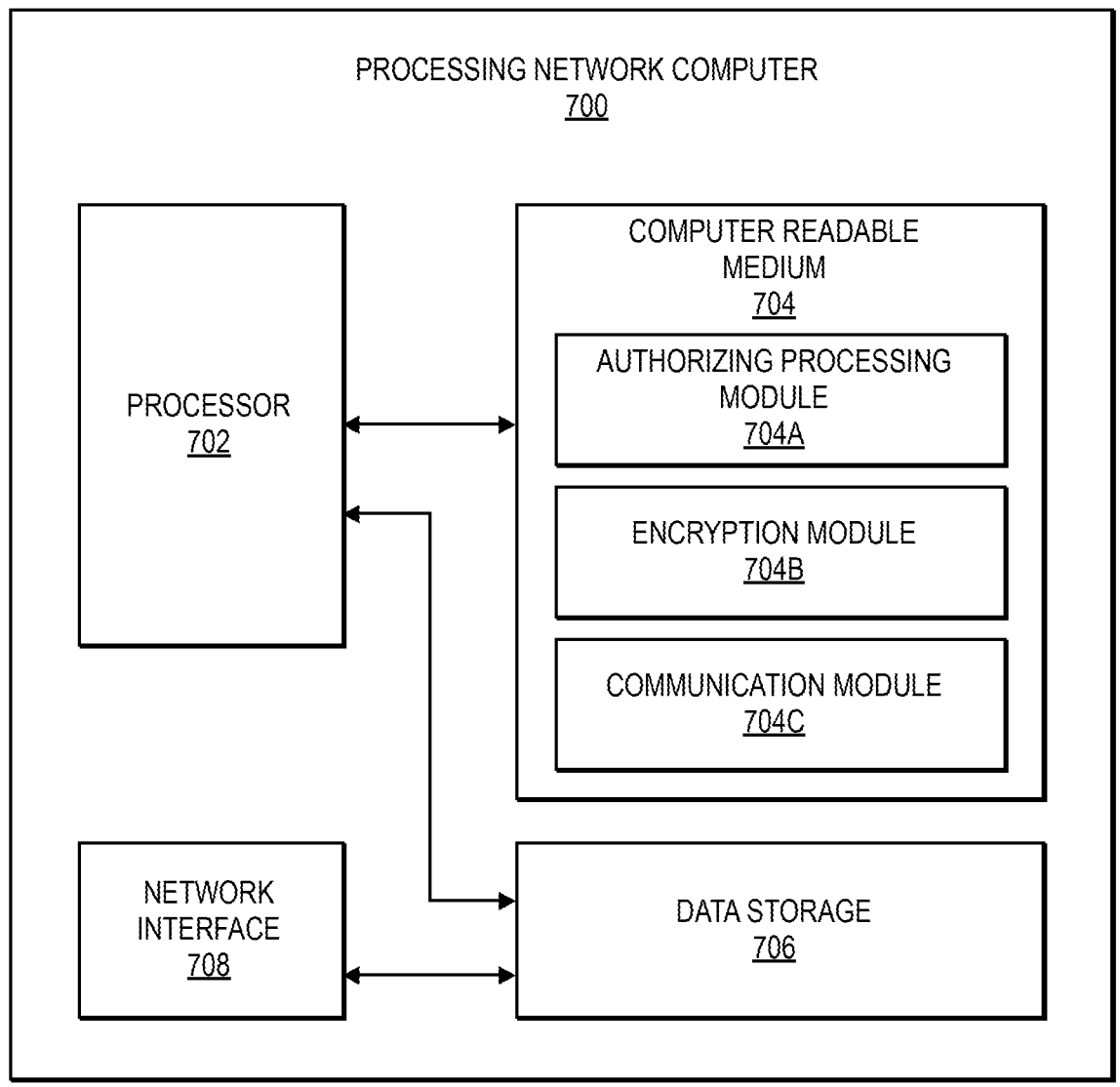
FIG. 7 shows a block diagram of a processing network computer, according to embodiments.

FIG. 7 shows a block diagram of a processing network computer 700 (e.g., processing network computer 112 of FIG. 1), according to some embodiments. The processing network computer 700 may comprise a processor 702, which may be coupled to a computer readable medium 704, data storage 706, and a network interface 708. The data storage 706 may contain access data such as tokens and/or account data, as well as mappings between access data, credentials, and/or communication device identifiers such as phone numbers, IP addresses, device identifiers, etc.

The computer readable medium 704 may comprise a number of software modules including an authorization processing module 704A, an encryption module 704B, and a communication module 704C. The computer readable medium may also comprise a clearing and settlement module (not shown).

The authorization processing module 704A may comprise code that can cause the processor 702 to evaluate authorization request messages for transactions and determine if the transactions should be authorized. The authorization processing module 704A may also include code for routing or modifying authorization request and response messages as they pass between various parties such as authorizing entity computers (e.g., issuer computers) and transport computers (e.g., acquirer computers).

The encryption/decryption module 704B may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption module 704B may utilize symmetric or asymmetric encryption techniques to encrypt and/or verify data. Cryptographic keys that may be used by the encryption/decryption module 704B may be securely stored in the data storage 606.

The communication module 704C may comprise code that causes the processor 702 to generate messages, forward messages, reformat messages, and/or otherwise communicate with other entities.

Embodiments of the invention have a number of advantages. For example, embodiments of the invention can allow resource provider computers to trust new user devices to conduct transactions, even though the resource provider computers had not previously interacted with them. Further, in some cases, only the device identifier of the new user device is provided to the resource provider computer to initiate the transaction. This allows for devices that do not have a user interface such as an alphanumeric key pad to interact with the resource provider computer. Further, since a sensitive credential does not need to be stored in the new user device when conducting a transaction with a resource provider computer, the sensitive credentials cannot be obtained by hackers who might hack into the user devices. Further, embodiments of the invention allow for user devices to conduct transactions without requiring a user to enter complicated credentials (e.g., sixteen digit card numbers) into them.

Although the above-described examples describe payment transactions, embodiments of the invention are not limited thereto. Embodiments of the invention can be used in authorization processes to access secure data on a server computer or access to a secure location (e.g., a train station, building, or airport).

As described, the methods described above may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:

receiving, by a resource provider computer that is a merchant computer from a first user device that is a home appliance configured to initiate a payment transaction and is not configured to store payment credential information for processing the initiated payment transaction and is not configured with an interface to receive an authentication input from a user, a transaction request comprising a device credential or a token, wherein the device credential or the token is previously associated with a second user device based on an enrollment process with an enrollment module, wherein the first user device is associated with the user;

retrieving, from a mapping stored in a memory of resource provider computer, an association between the device credential or token and the second user device, wherein the mapping indicates an association between payment credentials or tokens and a plurality of user devices, and wherein the mapping identifies a user device configured to act as an authenticating device;

identifying, by the resource provider computer, the second user device associated with the device credential or the token in the transaction request from the first user device based on the retrieved mapping, wherein the second user device acts as an authenticating device for the first user device according to the mapping to perform the authentication with the resource provider computer for the transaction request received from the first user device, wherein the first user device and second user device are associated with a same payment credential or token;

based on the second user device associated with the device credential or token being identified based on the retrieved mapping, transmitting, by the resource provider computer to the second user device, an authentication request to authenticate the resource provider computer with the first user device;

receiving, by the resource provider computer from the second user device, an authentication response, the authentication response comprising an indication that the first user device is authenticated;

transmitting, by the resource provider computer, an authorization request message to an authorizing entity computer in response to receiving the indication that the first user device is authenticated;

receiving an authorization response message authorizing the transaction request; and receiving from the first user device a subsequent transaction request, authenticating the subsequent transaction request without requiring authentication with the second user device.

2. The method of claim 1, wherein the resource provider computer receives the device credential associated with the user from the first user device, and the method further comprises:

obtaining, by the resource provider computer from a token provider computer, the token corresponding to the device credential and a cryptogram; and generating, by the resource provider computer, the authorization request message to include the token and the cryptogram, and exclude the device credential.

3. The method of claim 2, wherein the cryptogram includes data about an authentication method used in the authentication request.

4. The method of claim 1, wherein the authorization request message further includes a first identifier for the first user device and a second identifier for the second user device, wherein transmitting the authorization request message causes the authorizing entity computer to maintain an association between the payment credential, the first identifier for the first user device, and the second identifier for the second user device, the association allowing subsequent transactions initiated by the first user device to be conducted.

5. The method of claim 1, wherein prior to receiving the transaction request from the first user device, the method comprises:

receiving, by the resource provider computer, a first identifier of the first user device and a second identifier of the second user device;

associating, by the resource provider computer, the first user device with the second user device; and storing, by the resource provider computer, the first identifier of the first user device with the second identifier of the second user device in a database.

6. The method of claim 5, wherein identifying the second user device comprises retrieving the identifier of the second user device from the database.

7. The method of claim 1, wherein the first user device does not have a user interface that includes an alphanumeric key pad.

8. The method of claim 1, wherein the authentication request includes a biometric authentication request.

9. The method of claim 1, wherein the first user device is a household appliance and the second user device is a mobile phone.

10. A resource provider computer comprising:

one or more processors; and one or more computer-readable media comprising code, when executed by the one or more processors, cause the resource provider computer to perform a method comprising:

receiving, by the resource provider computer that is a merchant computer from a first user device that is a home appliance configured to initiate a payment transaction and is not configured to store payment credential information for processing the initiated payment transaction and is not configured with an interface to receive an authentication input from a user, a transaction request comprising a device credential or a token, wherein the device credential or the token is previously associated with a second user device based on an enrollment process with an enrollment module, wherein the first user device is associated with the user;

retrieving, from a mapping stored in a memory of resource provider computer, an association between the device credential or token and the second user device, wherein the mapping indicates an association between payment credentials or tokens and a plurality of user devices, and wherein the mapping identifies a user device configured to act as an authenticating device;

identifying the second user device associated with the device credential in the transaction request from the first user device based on the retrieved mapping, wherein the second user device acts as an authenticating device for the first user device according to the mapping to perform the authentication with the resource provider computer for the transaction request received from the first user device, wherein the first user device and second user device are associated with a same payment credential or token;

based on the second user device associated with the device credential or token being identified based on the retrieved mapping, transmitting, to the second user device, an authentication request to authenticate the resource provider computer with the first user device;

receiving, from the second user device, an authentication response, the authentication response comprising an indication that the first user device is authenticated;

transmitting an authorization request message to an authorizing entity computer in response to receiving the indication that the first user device is authenticated;

receiving an authorization response message authorizing the transaction request; and receiving from the first user device a subsequent transaction request, authenticating the subsequent transaction request without requiring authentication with the second user device.

11. The resource provider computer of claim 10, wherein the authorization response message is received from the authorizing entity computer.

12. The resource provider computer of claim 10, wherein the resource provider computer grants access to a secure location if the authorization request message is approved.

13. The resource provider computer of claim 10, wherein the device credential is a first identifier of the first user device.

14. The resource provider computer of claim 10, wherein the resource provider computer stores an association between the first user device and the payment credential, and wherein the method further comprises:

receiving a de-enrollment message comprising a first identifier of the first user device; and removing the association between the first user device and the payment credential.

15. The resource provider computer of claim 14, wherein the transaction request is a first transaction request and the authorization request message is a first authorization request message and wherein the method further comprises:

receiving, from the first user device, a second transaction request comprising the device credential associated with the user; and determining that the first user device is authenticated, and that communication with the second user device is not needed; and transmitting a second authorization request message in response to determining that the first user device is authenticated.

16. The resource provider computer of claim 10, wherein the resource provider computer receives the device credential associated with the user from the first user device, and the method further comprises:

obtaining, by the resource provider computer from a token provider computer, and a cryptogram; and generating, by the resource provider computer, the authorization request message to include the token and the cryptogram, and exclude the device credential.

17. The method according to claim 1, further comprising sending, by the resource provider computer, a token request message to a token service provider computer, the token request message requesting a cryptogram for the transaction, wherein the cryptogram comprises encrypted authentication method data, an encrypted account identifier, an encrypted transaction channel indicator, and encrypted expiration information.

18. The method according to claim 1, wherein the first user device does not include a user interface for alphanumeric input.

19. The method according to claim 1, wherein the payment credential information is sensitive credential information.

20. The method according to claim 1, wherein the device credential or token is a device identifier.

* * * * *